Figure 1:
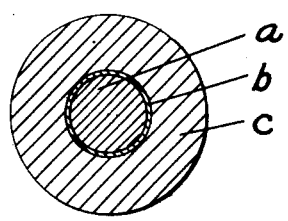

June 18, 1935.  J. FASSBENDER  2,005,614

RUBBER INSULATED CABLE

Filed Jan. 6, 1932

J. Fassbender
INVENTOR

By Marks & Clerk
ATTYS

Patented June 18, 1935

2,005,614

UNITED STATES PATENT OFFICE 2,005,614

RUBBER INSULATED CABLE

Josef Fassbender, Cologne-Nippes, Germany, assignor to Land und Seekabelwerke A. G., Cologne-Nippes, Germany Application January 6, 1932, Serial No. 585,085
In Germany January 15, 1931

6 Claims. (Cl. 173—264)

This invention relates to rubber insulated electric cables used in installations on ships and other places which are liable to be endangered by flooding occasionally or during the operation. In cables of usual construction with rubber insulated conductors, it is not possible to obtain a complete filling up of the interior of the cable by rubber and a firm adherence of all the cable parts, owing to the fact that the rubber insulation is not sufficiently plastic during its application and during the vulcanization completely to fill up narrow spaces in the interior of the cable, for instance, the triangular spaces between the individual cores. For the same reason, the rubber does not penetrate into the pores of the metallic cable parts, which is the preliminary condition for a good cementing of the metallic cable parts with a layer of rubber; further, when use is made of a stranded conductor, not all the intermediate spaces between the individual wires are filled up. Consequently intermediate spaces cannot be completely avoided at the following parts along the cable: in the case of a number of rubber insulated cores which are stranded together, in the middle triangular space between the individual cores, and when use is made of an outer rubber sheath surrounding the bundle of cores, in the outer triangular space between the individual cores and the outer rubber sheath; between the metallic parts of the cable, for instance between the solid conductors or conductors consisting of a strand or between the lead sheath and the rubber insulation and when a stranded conductor is used, between the individual wires of the conductor.

If the cable is under the action of water pressure it may occur that, owing to damage to the cable insulation at some point, the water spreads in the intervening free spaces along the cable. In this case it might happen that the water which has penetrated into the cable reaches for instance electrical apparatus to which the cable is connected or, in the case of ships, passes through the bulkheads traversed by the cables from one bulkhead to the other.

The disadvantage above referred to is avoided according to the present invention by completely filling up all the above-mentioned hollow spaces which are present in the cable and by cementing the surfaces which are in contact with one another, that is to say, between the consecutive layers of rubber or the metal and rubber surfaces by means of gutta-percha or gutta-percha-like substances. The cementing is effected by vulcanization when the insulation is completed.

Figure 2:
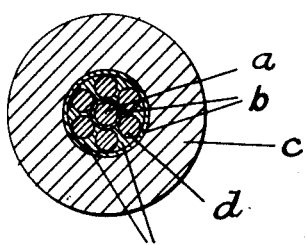
Figure 4:
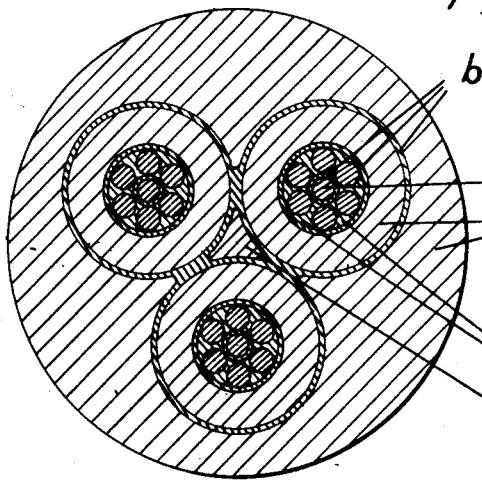
Figure 3:
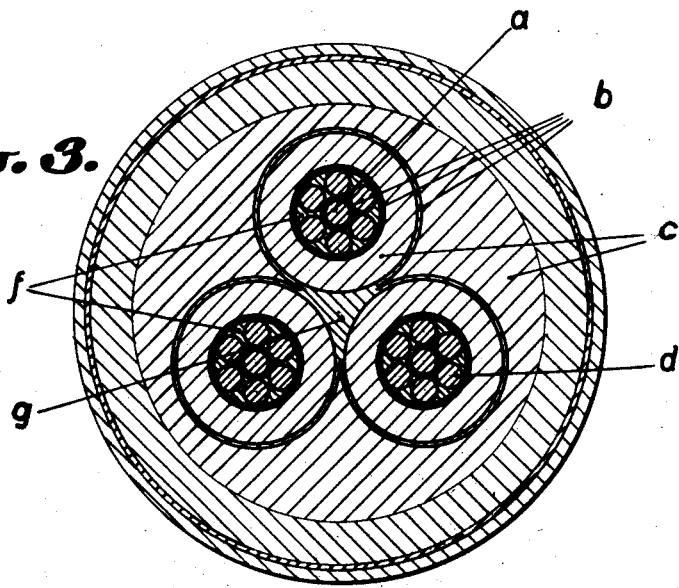

The accompanying drawing illustrates by way of example different constructions according to the invention, Figure 1 showing an insulated single core, the conducting part of which consists of a solid wire, Figure 2 showing another insulated single core in which the conducting part consists of a strand made of a plurality of wires, Figure 3 illustrates a multi-core cable the individual cores of which are constructed in the same way as in Figure 2, and Figure 4 shows a modification of the cable illustrated in Figure 3.

Referring to the construction illustrated in Fig. 1, a solid copper wire $a$ is surrounded with a thin layer $b$ of gutta-percha or gutta-percha-like substance before the rubber insulation $c$ is provided thereon. In order to obtain a firm adherence between the gutta-percha and the conductor, the latter may be passed through a composite substance such as, for instance, Chatterton compound before the gutta-percha is applied thereto.

If the cable has a conductor consisting of strands such as shown in Fig. 2, the central wire $a$ is first covered with a gutta-percha layer $b$; the subsequent layer or wires $d$ are also surrounded with a layer $b$ of gutta-percha and then the rubber sheathing $c$ is pressed thereon. The thickness of the said gutta-percha covering is such that the hollow spaces $f$ between the individual wires of the conductor and between the conductor wires and the rubber insulation are completely filled up.

If a number of cores such as shown in Figs. 1 and 2 are stranded together to a multi-core cable, each one of the cores is covered on its outer surface, before the stranding, with gutta-percha or a gutta-percha substance in order that on intimate contact be obtained between the cores when the individual cores are stranded together and in order that the central triangular space $g$ between the individual cores be filled with gutta-percha and further in order that when a rubber sheathing $c$ is provided over the stranded cores an intimate contact be obtained between the consecutive layers of rubber. In the construction illustrated in Fig. 3 two rubber sheathings $c$ are provided over the stranded cores. A further layer $b$ of gutta-percha is provided also on the outer rubber sheathing when the cable is provided with a lead sheathing $e$.

It is to be understood that the constructions illustrated in the drawing may be modified. Thus, for instance, the insulation of a single core need not consist of a single rubber sheathing as is shown in Figs. 1 and 2; a number of rubber sheathings may be used instead. Further, such a core may also be provided with a lead sheathing. Finally, the stranded conductor according to Fig. 2 may consist of a number of layers $d$ of wire and the stranded cores according to Fig. 3 may be provided with more than two rubber sheathings $c$. It is also to be understood that a suitably formed rubber insertion may be placed in the central triangular space $g$ of a multicore cable according to Figure 3. When use is made of such an insertion, a gutta-percha layer is provided between its surface and the surface of the cores which are stranded over it. Such a cable is illustrated in Fig. 4. This cable differs from that illustrated in Figure 3 essentially in that a shaped rubber insertion $h$ is provided in the central triangular space between the individual cores. The reference letters correspond to the same parts as those described in connection with Figure 3. In addition to the spaces between the individual wires of the strands, between the wires of the outermost layer and the core insulation, and between the surface of the individual cores and the rubber sheathing surrounding all the cores in common, the spaces between the surface of the individual cores and the surface of the rubber insertion $h$ are filled with gutta percha. If the cable is closed on the outside by means of a lead sheathing, the latter may also be provided with an outer armouring.

What I claim is:

1. A cable having metallic parts, a layer of a vulcanized rubber mixture constituting the actual insulation and a layer of gutta-percha between the metallic parts and the rubber insulation, which layer of gutta-percha is thin as compared with the thickness of the rubber insulation and serves to fill up the hollow spaces between the metallic parts and the rubber insulation and to cement the metallic parts with the rubber insulation during the vulcanization of the cable.

2. A cable having a stranded conductor, an insulation therefor of a vulcanized rubber mixture and gutta percha in the spaces between the individual stranded wires and between the wires and the adjacent rubber insulation, the thickness of the gutta percha between the wires and the rubber insulation being thin as compared with the thickness of the rubber insulation, for the purpose of filling up the hollow spaces between the individual wires and between the individual wires and the adjacent rubber insulation and for the purpose of cementing together the said individual parts during the vulcanization of the cable.

3. A rubber insulated cable having a number of cores which are stranded together and each one of which consists of a conductor, a surrounding rubber insulation, and of a gutta-percha material between the conductor and the surrounding rubber insulation for the purpose of cementing them together, in combination with a rubber sheathing surrounding all the cores and a layer of gutta-percha material surrounding each individual rubber insulated core, for the purpose set forth.

4. A cable having a number of rubber insulated cores which are stranded together, in which the conductors consist of a plurality of strands, a rubber sheath surrounding the bundle of cores, and gutta-percha in the spaces between the individual strands of each conductor, between the strands and the adjacent rubber insulation, between the outer surface of the cores and the surface of the rubber sheath surrounding the bundle of cores, and in the middle between the individual cores, for the purpose set forth.

5. A cable having a number of rubber insulated cores, a rubber sheath surrounding the bundle of cores, and gutta-percha between the conductor and the rubber insulation, between the outer surface of the individual cores and the surface of the rubber sheath surrounding the bundle of cores, and in the middle between the individual cores for the purpose of cementing the said parts together.

6. A cable having a number of rubber insulated cores, a rubber sheath surrounding the bundle of cores, a shaped rubber insertion in the central triangular space formed between the individual insulated cores, and gutta percha between the conductor and the rubber insulation, between the outer surface of the individual cores, and the surface of the rubber sheath surrounding the bundle of cores, and between the outer surface of the individual cores and the rubber insertion in the central triangular space of the cable for the purpose of cementing the said parts together.

JOSEF FASSBENDER.